United States Patent
Reppuhn et al.

(10) Patent No.: US 8,113,081 B2
(45) Date of Patent: Feb. 14, 2012

(54) UNIVERSAL SHIFTER SYSTEM FOR A VEHICLE

(75) Inventors: Tamara Reppuhn, Hemlock, MI (US); Michael C. Vermeersch, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 1286 days.

(21) Appl. No.: 11/810,726

(22) Filed: Jun. 7, 2007

(65) Prior Publication Data
US 2008/0156135 A1    Jul. 3, 2008

Related U.S. Application Data

(60) Provisional application No. 60/807,680, filed on Jul. 18, 2006.

(51) Int. Cl.
| B60K 20/00 | (2006.01) |
| B60K 20/06 | (2006.01) |
| F16H 59/04 | (2006.01) |
| F16C 1/10  | (2006.01) |
| G05G 9/00  | (2006.01) |

(52) U.S. Cl. .................. 74/473.3; 74/473.15; 74/473.31
(58) Field of Classification Search ................. 74/473.1, 74/473.12, 473.15, 473.21, 473.22, 473.24, 74/473.3, 473.31

See application file for complete search history.

(56) References Cited

U.S. PATENT DOCUMENTS

| 3,564,878 | A  | * | 2/1971  | Seatts ............................. 70/204 |
| 4,733,573 | A  |   | 3/1988  | Kramer |
| 4,936,431 | A  | * | 6/1990  | Shinpo ....................... 192/220.2 |
| 5,211,078 | A  | * | 5/1993  | McCarthy et al. .............. 477/99 |
| 5,853,348 | A  |   | 12/1998 | Lehman |
| 5,938,562 | A  |   | 8/1999  | Withey |
| 6,327,928 | B1 | * | 12/2001 | Bowerman et al. ........ 74/473.31 |
| 6,382,045 | B1 | * | 5/2002  | Wheeler ................... 74/473.12 |
| 6,382,046 | B1 |   | 5/2002  | Wang |
| 6,539,822 | B1 |   | 4/2003  | Wilson |
| 6,689,014 | B2 |   | 2/2004  | Flemming et al. |
| 6,945,377 | B2 |   | 9/2005  | Burr et al. |
| 7,137,499 | B2 |   | 11/2006 | Riefe et al. |
| 7,845,252 | B2 | * | 12/2010 | Vermeersch ............... 74/473.31 |
| 2003/0213673 | A1 | * | 11/2003 | Burr et al. ................. 192/220.2 |

* cited by examiner

*Primary Examiner* — Justin Krause
(74) *Attorney, Agent, or Firm* — Cantor Colburn LLP

(57) ABSTRACT

A universal shifter system that is adaptable to any of a variety of locations in a vehicle has a shift assembly with a frame supporting a shaft for rotation about a primary axis. An end of the shaft is exposed axially through the frame for circumferentially indexed attachment of either a shift arm or a cam device of the system dependent upon the selected system location in the vehicle. A side mount feature has a secondary axis that traverses the primary axis. The cam device rotates about both axes when selected. A shifter mechanism is supported by the frame and is constructed and arranged to rotate the shaft between park and drive positions. Preferably, a flexible park lock cable interfaces between the shifter mechanism and a start device of the vehicle to prevent the shaft from rotating from the park and into the drive position if the start device is not in a predetermined position.

11 Claims, 7 Drawing Sheets

UNIVERSAL SHIFTER SYSTEM FOR A VEHICLE

RELATED APPLICATIONS

This application claims priority of U.S. Provisional Patent Application Ser. No. 60/807,680 filed Jul. 18, 2006, which is incorporated herein by reference.

FIELD OF THE INVENTION

The present invention relates to a universal shifter system for a vehicle and more particularly to a shifter system having a shift assembly for an automatic transmission capable of being mounted in a variety of vehicle locations.

BACKGROUND OF THE INVENTION

Manual and automatic shifter levers for vehicles are known to be mounted on a steering column and on a center console (see U.S. Pat. No. 6,539,822, to Wilson, and incorporated herein by reference in its entirety). Shifter levers are also known to be part of an assembly that include a brake interlocking module, and an ignition key cylinder. The brake interlocking module prevents an operator from moving the shift lever out of a park position without first depressing the brake pedal (i.e. Brake Transmission Shift Interlock or BTSI). A brake interlock feature is disclosed in U.S. Pat. No. 6,945,377, to Burr and assigned to the same assignee as the present invention, and another embodiment is also disclosed in U.S. Pat. No. 5,853,348, to Lehman. Both patents are herein incorporated by reference in their entirety.

Steering column mounted shifter assemblies are also known to have cam actuators. Such actuators have a lever that carries a cam track which cooperates with a manual shift control lever to pivot the actuating lever. The actuating lever also has an output arm to which a transmission shift cable is secured. The shift cable moves substantially linearly when the actuator lever is pivoted (see U.S. Pat. No. 4,733,573, to Kramer and incorporated herein by reference in its entirety).

Unfortunately, the shifter assemblies are custom to any one application. For instance, an assembly for a steering column application is different than an assembly for a center console mount. This contributes toward greater manufacturing costs.

SUMMARY

A universal shifter system that is adaptable to any of a variety of locations in a vehicle has a shift assembly with a frame supporting a shaft for rotation about a primary axis. An end of the shaft is exposed axially through the frame for circumferentially indexed attachment of either a shift arm or a cam device of the system dependent upon the selected system location in the vehicle. A side mount feature has a secondary axis that traverses the primary axis. The cam device rotates about both axes when selected. A shifter mechanism is supported by the frame and is constructed and arranged to rotate the shaft between park and drive positions. Preferably, a flexible park lock cable interfaces between the shifter mechanism and a start device of the vehicle to prevent the shaft from rotating from the park and into the drive position if the start device is not in a predetermined position.

The selected cam device or the shift arm carry a cable connector for attachment to a shift cable preferably routed to an automatic transmission of the vehicle. The shifter mechanism preferably has a socket mount for attachment to any one of a variety of shift levers dependent upon the type of vehicle and the location chosen in the vehicle for mounting the system.

Objects, features and advantages of the present invention include a generic or universal shifter system that can be applied to any variety of applications such as a steering column mount, a dash mount and a center console mount. The versatility of the assembly reduces design and manufacturing costs and simplifies stocking and maintenance procedures. Other advantages include a robust design requiring little or no maintenance and in service has a long and useful life. Other advantages also include a flexible shifter assembly that can come with or without a BTSI, an assembly that provides flexibility for the shifter lever to be mounted in any desired vehicle location, and commonality with key shifter components which minimizes time and investment to the market.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
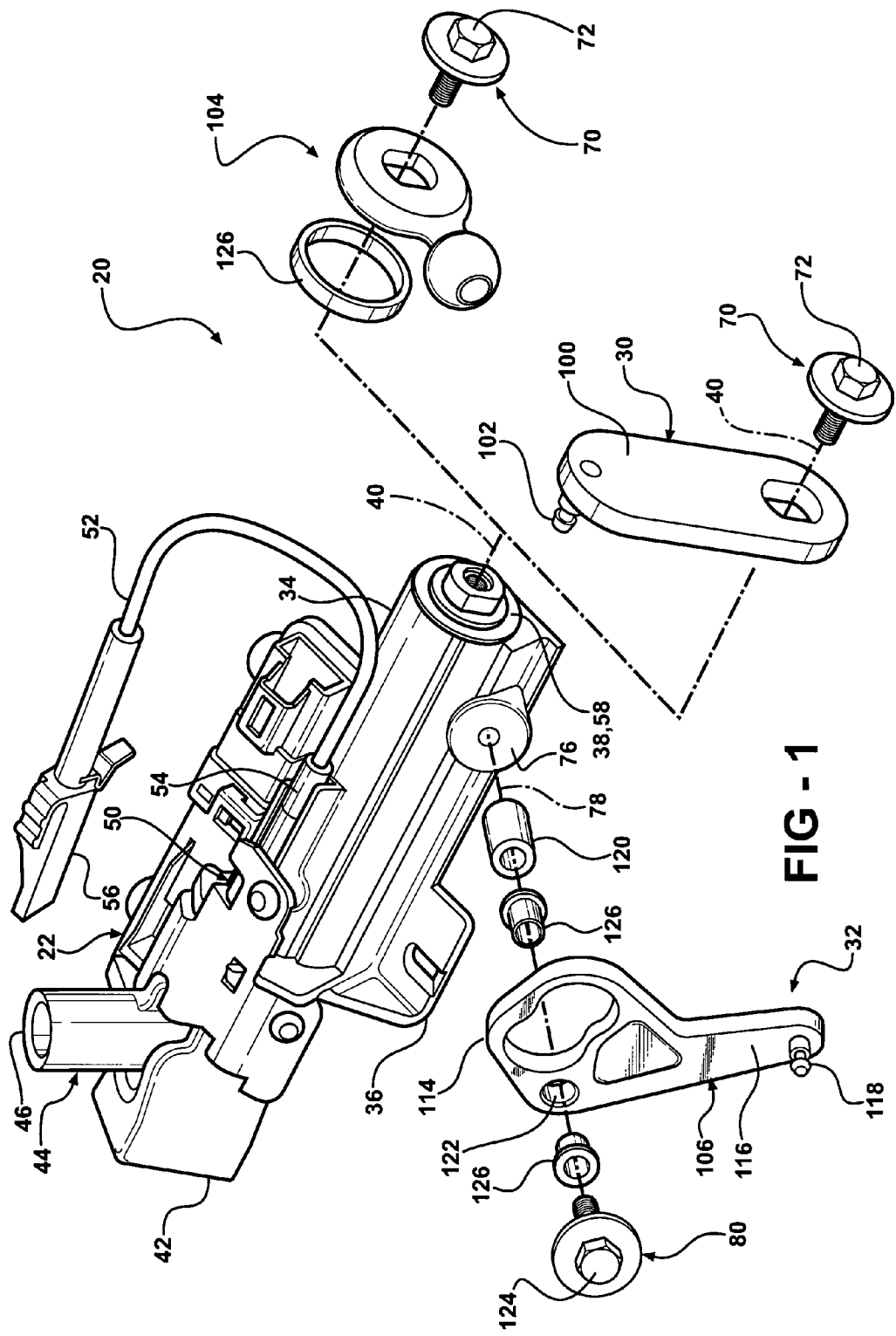
FIG. 1 is a partially exploded perspective view of a universal shifter system embodying the present invention.
Figure 2:
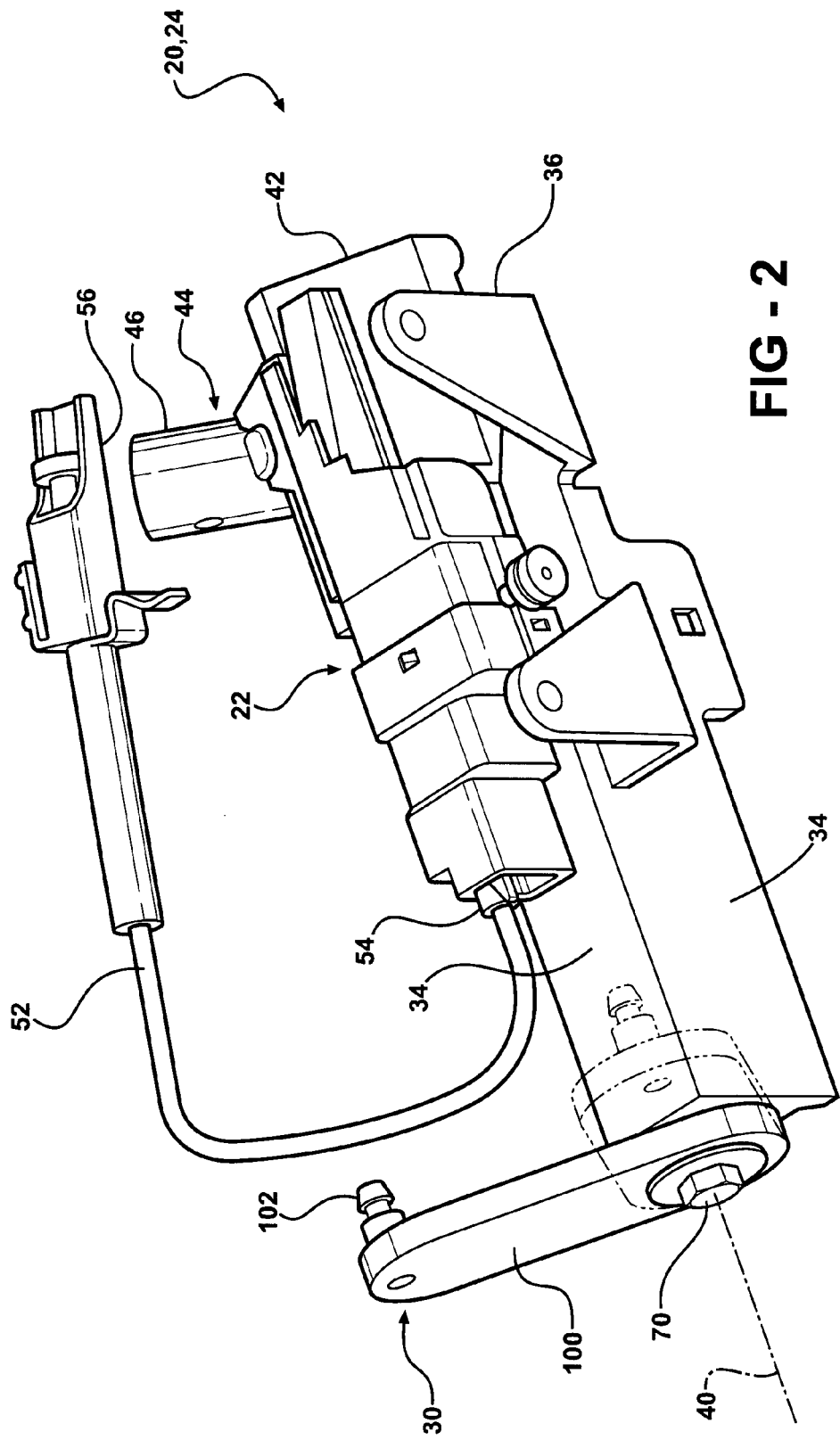
FIG. 2 is a perspective view of the shifter system utilized in a dash mounted application with a shift arm in a park position.
Figure 3:
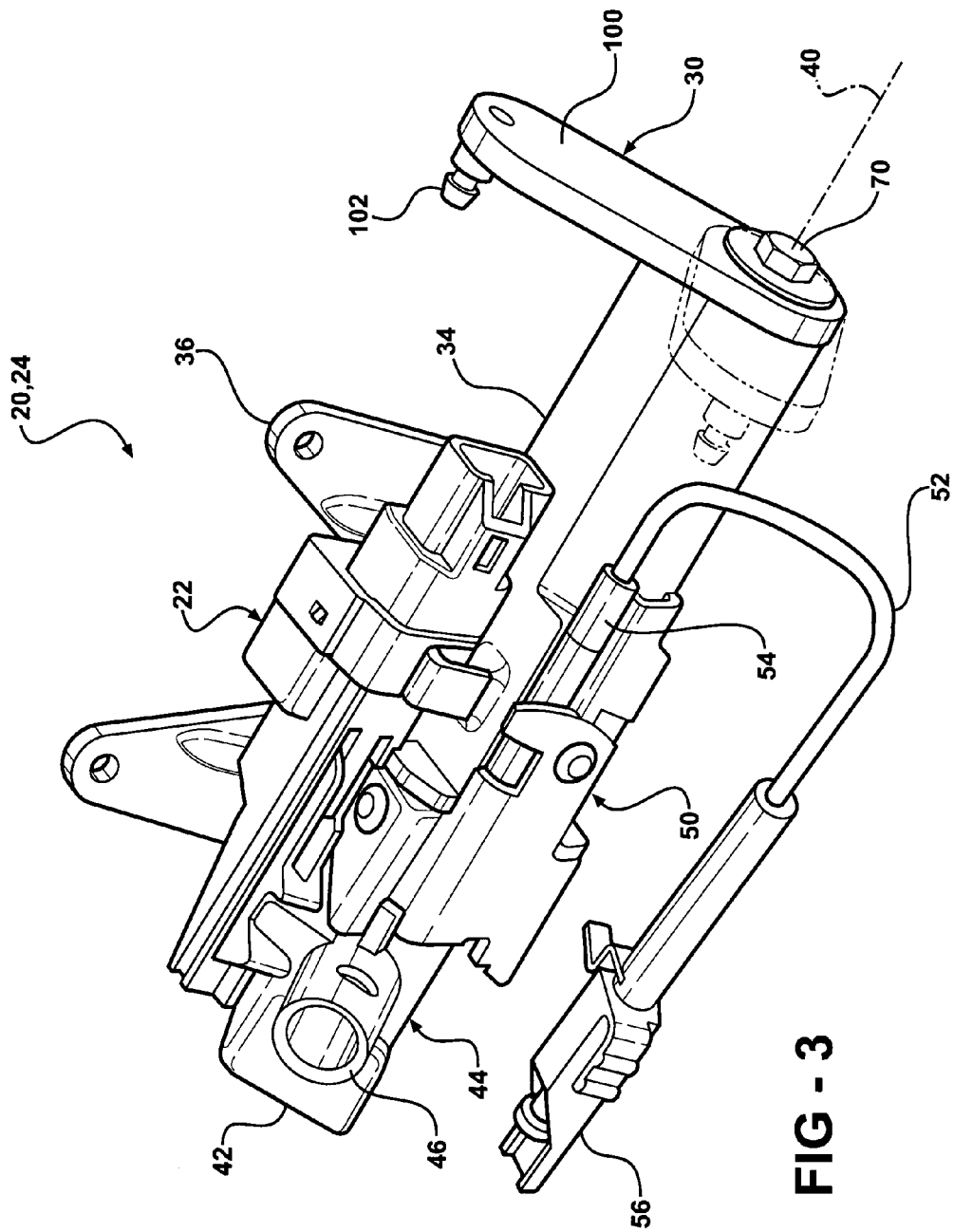
FIG. 3 is a perspective view of the shifter system utilized in the dash mounted application with the shift arm in a drive position.
Figure 4:
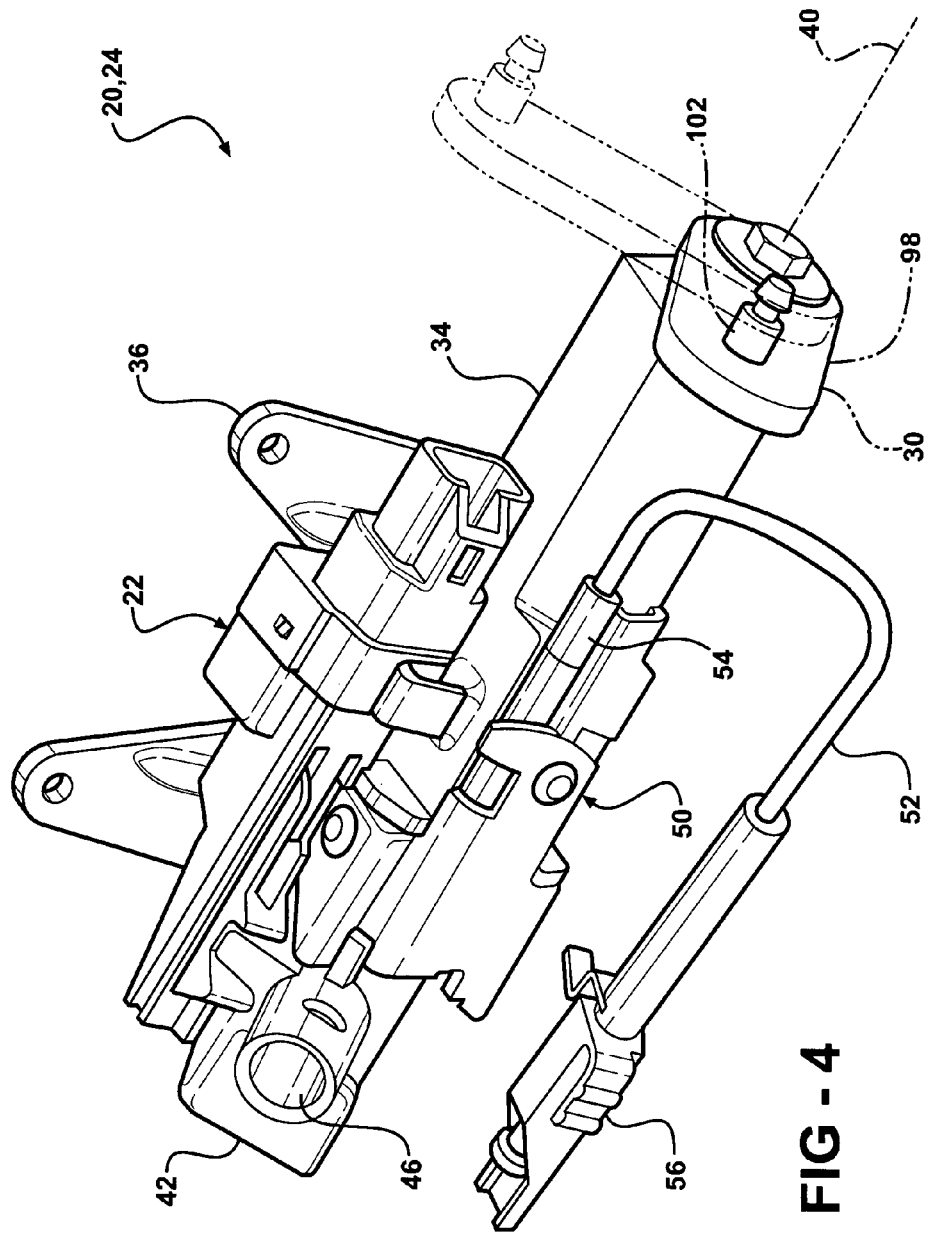
FIG. 4 is a perspective view of the shifter system similar in perspective to FIG. 3 but utilized in a center console application.

Referring generally to FIG. 1 an elongated universal shifter system 20 embodying the present invention has a shift assembly 22 capable of being mounting in any one of a plurality of locations or applications in the vehicle. These preferred applications are a dash mounted application 24 (see FIGS. 2-3), a center console mounted application 26 (see FIG. 4) and a steering column mounted application 28 (see FIG. 5). In addition to the shift assembly 22, the shifter system 20 also has a shift arm 30 and a cam device 32, both for actuating a shift cable (not shown) preferably of a Bowden type. The shift arm 30 and cam device 32 are interchangeable with one another and thus selectively engage removably to the shift assembly 22. Preferably, the shift arm 30 of system 20 is attached to the shift assembly 22 for the dash mounted and center console applications 24, 26, and the cam device 32 of system 20 is attached to the shift assembly 22 for the steering column mounted application 28.

The shift assembly 22 of the shifter system 20 has a stationary housing or frame 34 having a support bracket 36 orientated to secure the assembly 22 to the vehicle in any of the applications 24, 26, 28 without requiring modification. A shaft 38 of the assembly 22 is located substantially in and engaged rotatably to the frame 34 for rotation about an axis 40. Preferably, the frame 34 supports a brake transmission shift interlock module (BTSI) 42 and a shifter mechanism 44 of the assembly 22. The shifter mechanism 44 connects operatively to the shaft 38 for rotation of the shaft, and has a socket mount 46 that extends radially outward with respect to the shaft 38 for attachment to a traditional shift lever appropriately positioned so that a vehicle operator may comfortably grasp the lever (not shown). Preferably, any one of a plurality of levers are compatible with the socket mount 46, thus any one lever is specific and accordingly stylized for any one application 24, 26, 28. That is, the shift lever is preferably not part of the system 20 in the sense that the shift lever is preferably stylized and customized for a particular vehicle model and a particular vehicle application 24, 26, 28.

During operation, the shifter mechanism 44 functions to rotate the shaft 38 thus pivot either the shift arm 30 or the cam device 32 that in-turn actuates the shift cable (not shown) routed to a combustion engine transmission of the vehicle. Preferably, and for automatic transmissions, the shift mechanism 44 requires the operator to first release the socket mount 46, and thus the shift lever, before moving the shift lever circumferentially with respect to the shaft 38 and primary axis 40 and between park and at least one drive position (see FIG. 2 for the park position and FIG. 3 for the drive position). Movement of the shift lever between park and drive positions causes the shaft 38 to rotate about the primary axis 40. To release the lever before such circumferential or rotational movement, preferably, the socket mount 46 is first generally pulled in a axial direction with respect to primary axis 40 and preferably against a biasing force exerted, for instance, by a spring element of the mechanism 44 (not shown).

The assembly 22 of the system 20 may also have a parklock inhibitor 50 having a flexible park lock cable 52. A base end portion 54 of the cable 52 is mechanically and operatively linked to the shifter mechanism 44 and an opposite distal end portion 56 of the cable 52 is constructed and arranged to mechanically link to any one of a variety of vehicle start devices (not shown). The length and flexibility of the cable 52 enables versatility in the location of the start device generally independent of the location of the system 20 in the vehicle. Preferably, the start device is a key cylinder that may be mounted to a steering column or a dash of the vehicle and the distal end portion 56 is a mechanically operative connector snap locked to the key cylinder.

Figure 6:
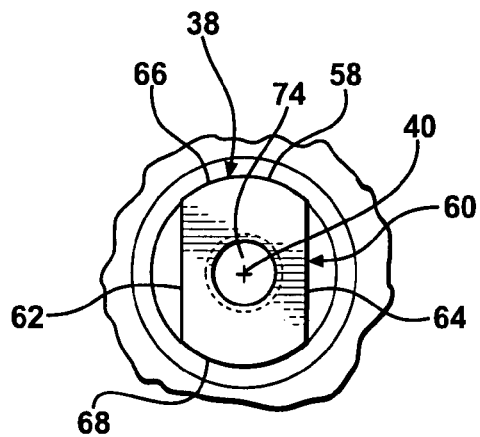
FIG. 6 is an end view of a shifter shaft of a shift assembly of the shifter system.
Figure 7:
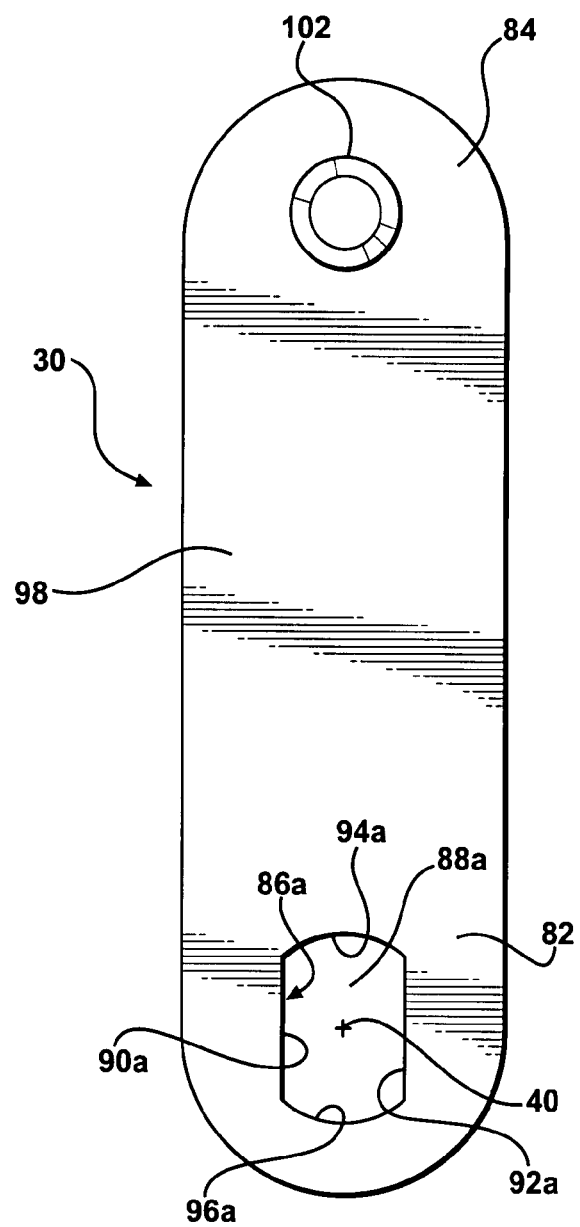
FIG. 7 is a side view of the shift arm of the shifter system for the dash and center console mounted applications.
Figure 8:
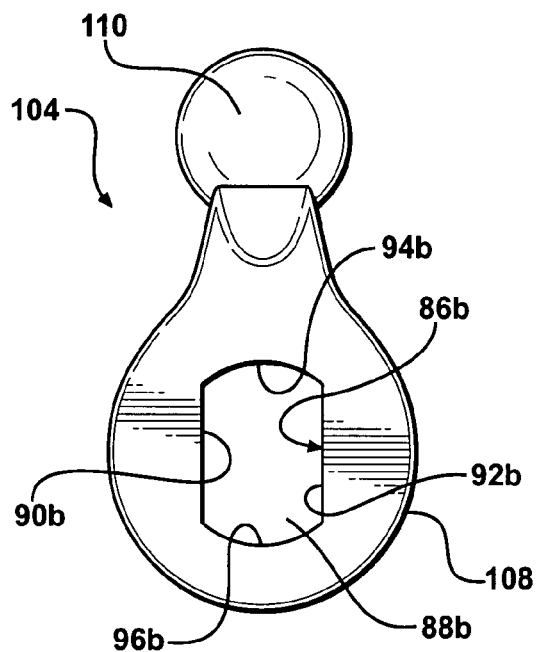
FIG. 8 is a side view of a cam actuator of a cam device of the shift assembly for the steering column application of the shifter system.

Referring to FIGS. 1 and 6, the shaft 38 of the assembly 22 has a distal end 58 exposed axially through the frame 34 and with respect to rotation axis 40. The distal end 58 carries a circumferential male indexing feature 60 that preferably has a "Double-D" shaped profile for removable attachment of the shift arm 30 and cam device 32 of the system 20. Indexing feature 60 preferably has two diametrically opposite and planar faces 62, 64 carried by the shaft end 58 and separated circumferentially by two diametrically opposite and arcuate faces 66, 68. Preferably, a threaded fastener or bolt 70 having an enlarged head 72 of the assembly 22 threads into a threaded bore 74 located in the shaft end 58 and orientated concentrically with respect to axis 40. The enlarged head 72 is of sufficient size to secure the arm 30 or device 32 of the system 20 axially to the end 58 of the shaft 38. Because axial mounting of the shift arm 30 or cam device 32 preferably has no rotational adjustment with respect to axis 40, one skilled in the art would now know that the "Double-D" shaped profile of indexing feature 60 may be a "single-D" profile. If rotational adjustment of the arm 30 or device 32 with respect to shaft 38 is desired instead of the preferred simplification of assembly where there is no adjustment factor, then the indexing feature 60 may be a multitude of axially elongated splines evenly spaced circumferentially away from one another.

Referring to FIGS. 1-3 and 7, the elongated shift arm 30, for the dash and center console mounted applications 24, 26, has a base end portion 82 and a distal end portion 84. The base end portion 82 carries a circumferential indexing feature 86a preferably of a female-type for mating with the male indexing feature 60 of the shaft end 58. Female indexing feature 86a may therefore conform to the male indexing feature 60 or "Double-D" profile of the shaft end 58 and thus has a hole 88a defined by two diametrically opposing planar surfaces 90a, 92a carried by the end portion 82 and separated circumferentially by two diametrically opposite and arcuate or concave surfaces 94a, 96a. Surfaces 90a, 92a, 94a, 96a form one continuous perimeter that faces radially inward with respect to primary axis 40 and span laterally and axially between opposite first and second surfaces 98, 100 of the arm 30 located substantially perpendicular to axis 40. A cable connector or pin 102 of the arm 30 is substantially normal to and projects outward from the first surface 98 for pivoting engagement with the transmission shift cable (not shown) preferably of a Bowden type.

When the shifter system 20 is utilized in the dash mounted application 24, the first surface 98 of the shift arm 30 may axially face the assembly 22, thus the cable connector 102 projects axially inward or toward the assembly 22. When the shifter system 20 is utilized in the center console mounted application 26, the shift arm 30 may be reversed or generally flipped, then axially reinserted on the shaft end 58 causing the first surface 98 to face axially away from the assembly 22 and the cable connector 102 to project axially away from the assembly. Preferably when flipping the shift arm 30 between applications, the circumferential alignment remains the same. To enable flipping of the shift arm 30, the male and female indexing features 60, 86a are both generally parallel to axis 40 (i.e. no frustum or tapering effect).

Figure 5:
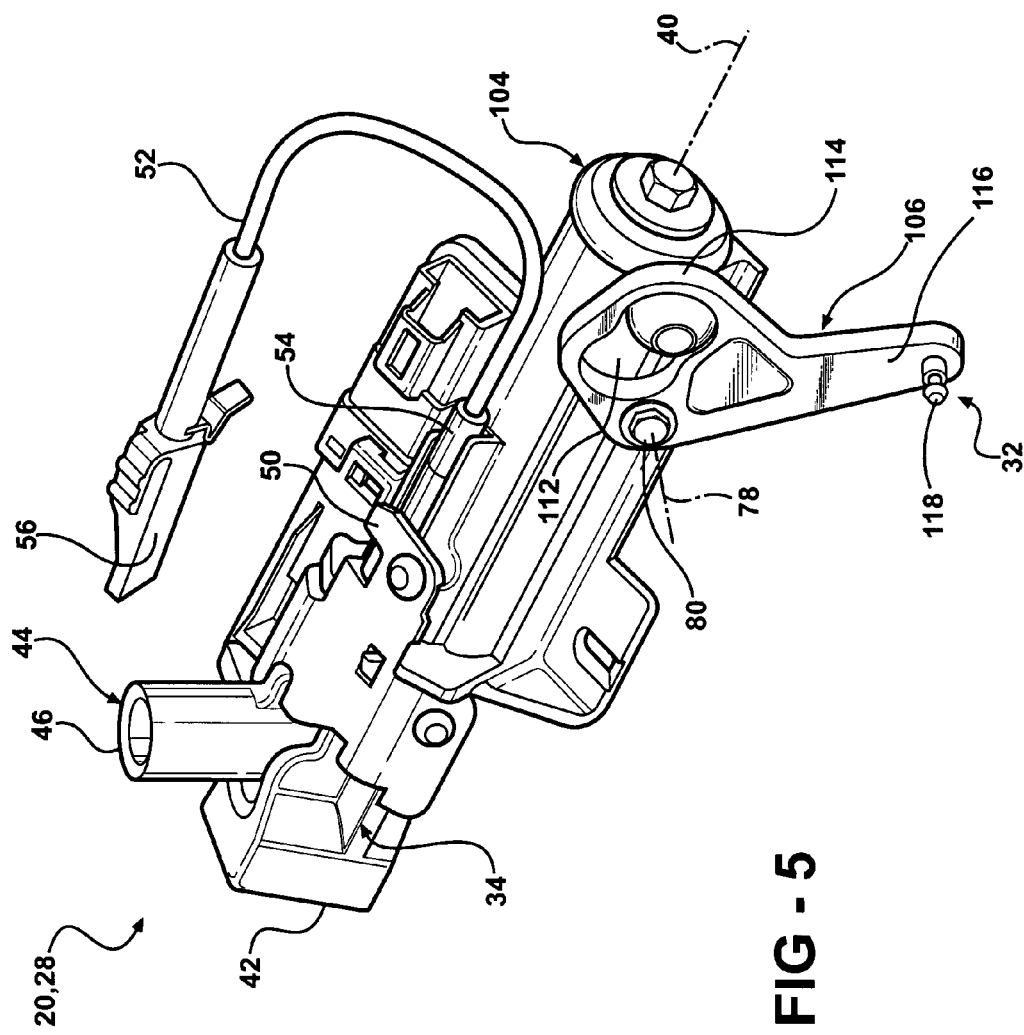
FIG. 5 is a side view of the shifter system utilized in a steering column application.

Referring to FIGS. 1 and 5, the assembly 22 also has a side mount feature 76 having a secondary axis 78 that traverses the primary axis 40 at about a right angle. Preferably, side mount feature 76 is a threaded bore located in the frame 34 and concentrically to axis 78 for optional threaded receipt of a boss-like fastener or threaded bolt 80 of the cam device 32 of the system 20. The side mount feature 76 physically exists but is generally not used if the system 20 is utilized in the dash or center console mounted applications 24, 26, but is preferably needed for mounting of the cam device 32 for the steering column mounted application 28.

Referring to FIGS. 1, 5 and 8-9, the cam device 32 of the shifter system 20 has a cam actuator 104 that removably connects to the distal end 58 of the shaft 38 of the shift assembly 22 and a cam member 106 that removably connects to the mount feature 76 of the frame 34 of the shift assembly 22. Rotation of the shaft 38 causes the cam actuator 104 to pivot in the same first imaginary plane as the shift arm 30. This pivoting action of the actuator 104 causes the cam member 106 to pivot about the secondary axis 78 and in a second imaginary plane that is substantially perpendicular to the first imaginary plane. Because the shift cable (not shown) is actuated by the cam member 106, routing of the shift cable may substantially be initially parallel to the primary axis 40, thus preferred for the steering column mount application 28. In contrast, initial routing of the shift cable for the dash and central mount applications 24, 26 is substantially perpendicular to axis 40.

The cam actuator 104 of the cam device 32 has a base end portion 108 and a distal end portion 110. Similar to the shift arm 30, the base end portion 108 carries a circumferential indexing feature 86b preferably of a female-type for mating with the male indexing feature 60 of the shaft end 58. Female indexing feature 86b therefore conforms to the male indexing feature 60 or "Double-D" profile of the shaft end 58 and thus has a hole 88b defined by two diametrically opposing planar surfaces 90b, 92b carried by the end portion 108 and separated circumferentially by two diametrically opposite and arcuate or concave surfaces 94b, 96b. Surfaces 90b, 92b, 94b, 96b form one continuous perimeter that faces radially inward with respect to primary axis 40 and span laterally and axially between opposite first and second surfaces located substantially perpendicular to axis 40. The distal end portion 110 preferably is or carries a substantially spherical cam feature or ball portion that inserts into an arcuate slot 112 of the cam member 106. End portion or ball portion 110 may be an integral and unitary part of the cam actuator 104 or it may be made of a friction reducing material such as a type of plastic snap fitted or adhered to the projecting end of the remaining portion of the cam actuator 104.

The cam member 106 of the cam device 32 has a planar cam segment 114 projecting radially outward from the secondary axis 78, and which defines the arcuate slot 112 for sliding receipt of the ball portion 110 of the cam actuator 104. An arm segment 116 of the cam member 106 also projects radially outward with respect to axis 78 and to a distal end engaged to a cable connector or pin 118. The cable connector 118 preferably projects axially outward with respect to axis 78 and pivotally engages to the shift cable leading to the automatic transmission of the vehicle.

Figure 9:
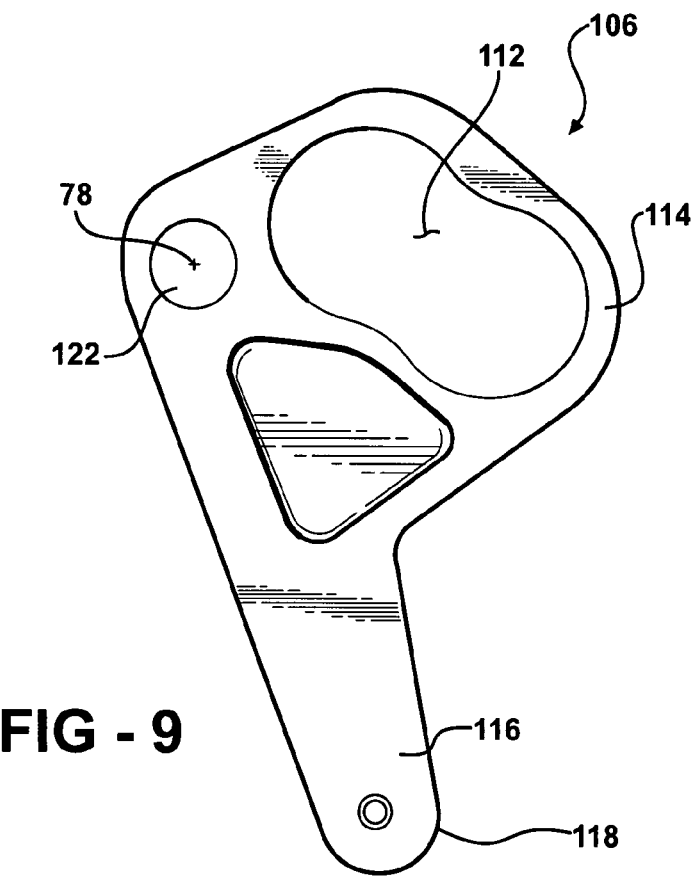
FIG. 9 is a side view of a cam member of the cam device.

Referring to FIGS. 1 and 9, for rotational engagement of the cam member 106 to the frame 34, the cam device 32 preferably has a sleeve 120 that generally seats at one end to the frame 34 of the assembly 22 and extends concentrically to the axis 78. A round hole 122 in the cam member 106 receives the sleeve 120 for rotation. The bolt 80 preferably has an enlarged head 124 that is greater than a diameter of the hole 122 for securing the member 106 to the frame 34. The bolt 80 extends through the member 106, concentrically through the sleeve 120 and threads into the side mount feature or threaded bore 76 in the frame 34. The cam device 32 may also have a plurality of bushings 126 distributed between the cam actuator 104 and the cam member 106 to further reduce friction during rotational movement.

While the forms of the invention herein disclosed constitute presently preferred embodiments, many others are possible. For instance, the sleeve 120 may be a unitary part of the frame 34 (i.e. manufactured as one unitary piece), thus part of the side mount feature 76 of the assembly 22 instead of being part of the cam device 32. It is not intended herein to mention all the possible equivalent forms or ramification of the invention. It is understood that terms used herein are merely descriptive, rather than limiting, and that various changes may be made without departing from the spirit or scope of the invention.

The invention claimed is:

1. A universal shifter system is adaptable to any of a variety of locations in a vehicle and is thus capable of connecting with any respective one of a variety of shift levers, any respective one of a variety of shift cables and a start device located in any of a variety of remote locations, the universal shifter system comprising:
   a frame;
   a shaft supported rotatably by said frame along a first axis, said shaft having a distal end that is indexed circumferentially and exposed through said frame;
   a shifter mechanism supported by the frame and connected operatively to said shaft;
   a flexible park lock cable having a base end portion connected operatively to said shifter mechanism and a distal end portion for connection to the start device;
   a boss sleeve fixed rigidly to said frame and projecting outward along a second axis that traverses said first axis;
   a removable cam actuator projecting radially outward from and indexed circumferentially to said distal end for rotation about said first axis;
   a cam member engaged to said boss for rotation about said second axis; and
   said cam member being cammed to said cam actuator.

2. The universal shifter system set forth in claim 1 further comprising:
   said removable cam member having a cam segment engaged operatively to said cam actuator and an arm segment projecting radially outward with respect to said second axis; and
   a cable connector projecting axially outward from said arm segment for connection to at least one of the variety of shift cables.

3. The universal shifter system set forth in claim 2 wherein said cam actuator has a ball portion fitted slidably in an arcuate slot in said cam segment.

4. The universal shifter system set forth in claim 1 further comprising a transmission shift interlock module supported by said frame.

5. The universal shifter system set forth in claim 1 further comprising a support bracket fixed rigidly to said frame for attachment to the vehicle in all of the variety of locations.

6. The universal shifter system set forth in claim 1 further comprising a mount constructed and arranged to operate with and projecting outward from said shaft, wherein said mount is for connection to any one of the variety of shift levers.

7. The universal shifter system set forth in claim 1 further comprising a removable shift arm projecting radially outward from and indexed circumferentially to said distal end.

8. The universal shifter system set forth in claim 7 wherein said removable shift arm is reversable between a first mounting position and a second mounting position.

9. The universal shifter system set forth in claim 8 further comprising a cable connector engaged to a distal end of said removable shift arm, wherein said cable connector projects axially inward with respect to said first axis when in said first mounting position and axially outward when in said second mounting position.

10. A universal shifter system is adaptable to any of a variety of locations in a vehicle and is thus capable of connecting with any respective one of a variety of shift levers, any respective one of a variety of shift cables and a start device located in any of a variety of remote locations, the universal shifter system comprising:
    a frame;
    a shaft supported rotatably by said frame along a first axis said shaft having a distal end that is indexed circumferentially and exposed through said frame;
    a shifter mechanism supported by the frame and connected operatively to said shaft; and
    a flexible park lock cable having a base end portion connected operatively to said shifter mechanism and a distal end portion for connection to the start device;
    a removeable shift arm projecting radially outward from and indexed circumferentially to said distal end;
    a threaded bore in said frame and disposed concentrically to a second axis that traverses said first axis;
    a removable cam actuator projecting radially outward from and indexed circumferentially to said distal end for rotation about said first axis;
    a removable cam member cammed to said cam actuator; and
    a boss fastener extending along said second axis and threaded into said threaded bore for rotational engagement of said cam member about said second axis.

11. The universal shifter system set forth in claim 10 further comprising a cable connector engaged to said cam member for attachment of the shift cable.

* * * * *